(12) United States Patent
Edwards et al.

(10) Patent No.: US 8,379,190 B2
(45) Date of Patent: Feb. 19, 2013

(54) RESONANT SCANNER FOR 3D MAPPING

(75) Inventors: Matthew A. Edwards, Albuquerque, NM (US); Steven F. Griffin, Albuquerque, NM (US); Michael S. Salisbury, Rio Rancho, NM (US); John P. Nicholson, Rio Rancho, NM (US)

(73) Assignee: The Boeing Company, Chicago, IL (US)

( * ) Notice: Subject to any disclaimer, the term of this patent is extended or adjusted under 35 U.S.C. 154(b) by 152 days.

(21) Appl. No.: 12/714,180

(22) Filed: Feb. 26, 2010

(65) Prior Publication Data

US 2011/0211187 A1 Sep. 1, 2011

(51) Int. Cl.
*G01C 3/08* (2006.01)

(52) U.S. Cl. ...... 356/4.01; 356/3.01; 356/4.1; 356/5.01; 356/5.1

(58) Field of Classification Search ........ 356/3.01–28.5, 356/139.01–139.1
See application file for complete search history.

(56) References Cited

U.S. PATENT DOCUMENTS

| | | | |
|---|---|---|---|
| 2004/0130765 A1* | 7/2004 | Gessner et al. | 359/224 |
| 2004/0141170 A1* | 7/2004 | Jamieson et al. | 356/5.01 |
| 2007/0008514 A1* | 1/2007 | Krasutsky | 356/4.01 |
| 2008/0002176 A1 | 1/2008 | Krasutsky | |

FOREIGN PATENT DOCUMENTS

DE 3904634 A1 8/1990

OTHER PUBLICATIONS

Extended European Search Report dated Jul. 1, 2011 for EP Application Serial No. 11156103.1-2220, Applicant: The Boeing Company, 034219 (5 pages).
"Geomapper Rotometrix 3D laser mapper installed under a Hughes 500 helicopter." Laser Optronix: The laser and opto Web site. http://www.laseroptronix.se/flyg/survairinst.html.
Conference Paper on Boeing Ladar work: "Design and Development of a Compact Single Photon Detection LADAR Camera," *SPIE Defense, Security & Sensing Conference 2009*.

* cited by examiner

*Primary Examiner* — Luke Ratcliffe
(74) *Attorney, Agent, or Firm* — Vista IP Law Group LLP; Cynthia A. Dixon

(57) ABSTRACT

A system, apparatus, and method are disclosed for a resonant scanner for three-dimensional (3D) mapping. The system, apparatus, and method employ a small, lightweight articulating device that performs as a 3D Laser Detection and Ranging (LADAR) laser from a moving scanner platform in a way that provides geolocation and takes advantage of mechanical resonance to amplify motion in the tilt axis. The device is used to map terrain in 3D space. The disclosed method involves resonating the scanner platform of the device with a spring about a pivot. The method further involves determining with a position sensor the tilt position and/or resonance rate of the scanner platform. Further, the method involves applying torque with an actuator to the scanner platform, and controlling with a controller the resonance of the scanner platform.

19 Claims, 3 Drawing Sheets

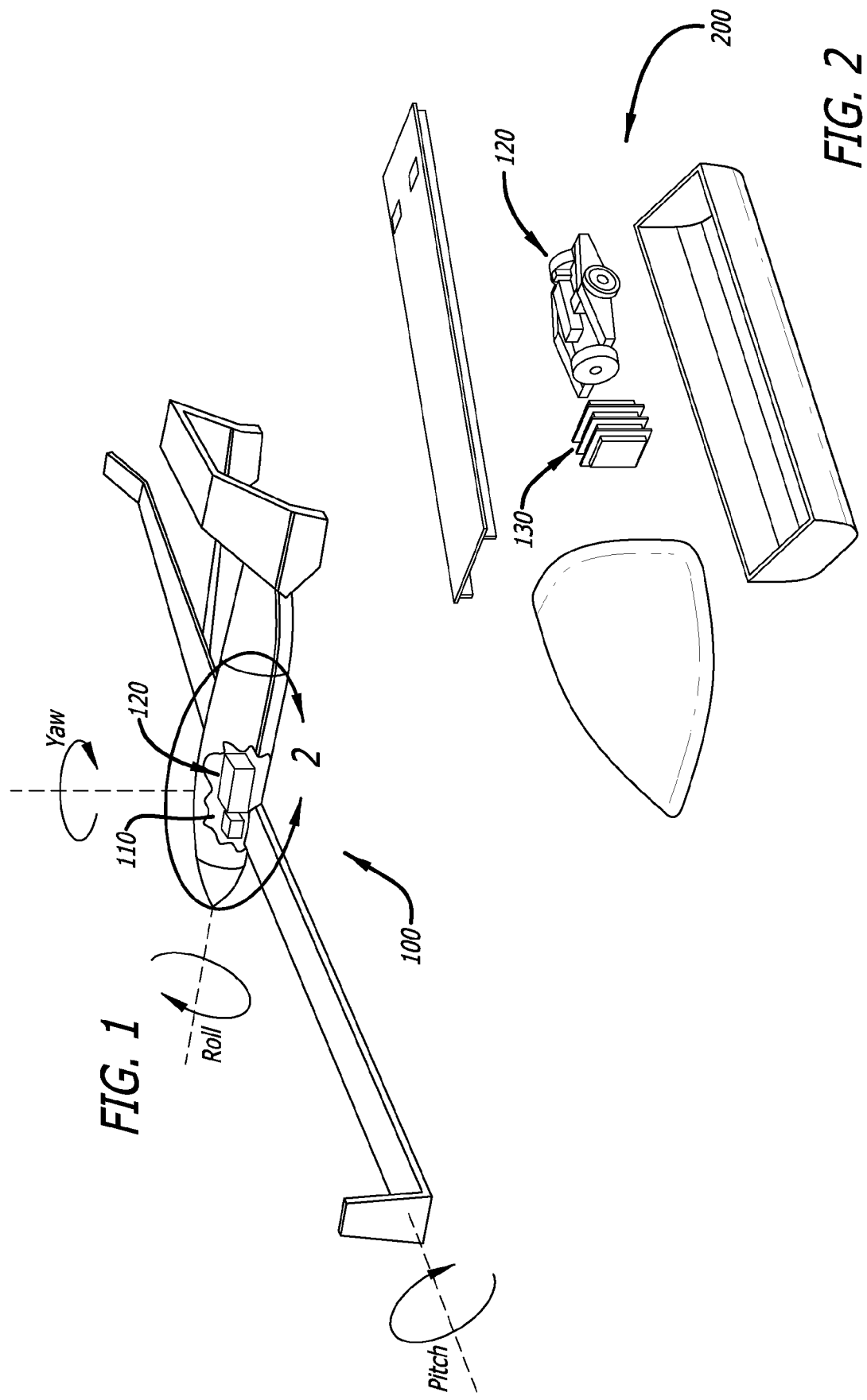

RESONANT SCANNER FOR 3D MAPPING

BACKGROUND

The present disclosure relates to a resonant scanner for three-dimensional (3D) mapping. In particular, it relates to a small, lightweight articulating device that performs as a 3D Laser Detection and Ranging (LADAR) laser from a moving platform in a way that provides geolocation and takes advantage of mechanical resonance to amplify motion in the tilt axis.

SUMMARY

The present disclosure relates to a system, apparatus, and method for a resonant scanner for 3D mapping. In one or more embodiments, the resonant scanner for 3D mapping involves a LADAR laser and sensor that is mounted on a scanner platform. The scanner platform is mounted on a pivot. Also, a spring is connected to the scanner platform, and causes the scanner platform to resonate about the pivot. In addition, a position sensor is attached to the scanner platform in order to determine the tilt position and/or resonance rate of the scanner platform. Additionally, an actuator is attached to the scanner platform, and applies torque to the scanner platform. Also, a controller is connected to the position sensor and the actuator in a feedback loop configuration, and is used to control the resonance of the scanner platform.

In one or more embodiments, the scanner platform has an inertia J, and the spring has a spring constant K. The scanner platform resonates at an angular frequency $$\omega_n = \sqrt{\frac{K}{J}}.$$

In some embodiments, a signal generator is connected to the controller. The signal generator provides a periodic signal at an angular frequency $\omega \approx \omega_n$. In one or more embodiments, types of periodic signal employed include, but are not limited to, a sine wave, a square wave, and a saw tooth wave.

In some embodiments, the actuator comprises a magnet and an inductive coil. In alternative embodiments, the actuator comprises a piezoelectric crystal. In at least one embodiment, the LADAR laser radiates a pulsed beam. In addition, in some embodiments, the scanner platform resonates in a roll direction and/or a pitch direction.

In one or more embodiments, the method for three-dimensional (3D) mapping involves providing a resonant scanner. The resonant scanner for this method includes a LADAR laser and sensor that are mounted on a scanner platform. The scanner platform is mounted on a pivot. In addition, a spring, a position sensor, and an actuator are each connected to the scanner platform. Also, a controller is connected to the position sensor and the actuator in a feedback loop configuration.

This method further involves resonating with the spring the scanner platform about the pivot. Also, the method involves determining with the position sensor the tilt position and/or resonance rate of the scanner platform. Further, the method involves applying torque with the actuator to the scanner platform, and controlling with the controller the resonance of the scanner platform.

In some embodiments, the resonant scanner for three-dimensional (3D) mapping involves a laser detection and ranging (LADAR) laser means and sensor means. The LADAR laser means and sensor means are mounted on a scanner platform means. Also, the scanner platform means is mounted on a pivot means. In addition, a spring means is connected to the scanner platform means, and causes the scanner platform means to resonate about the pivot means. Additionally, a position sensor means is attached to the scanner platform means in order to determine the tilt position and/or resonance rate of the scanner platform means.

In one or more embodiments, the resonant scanner also involves an actuator means that is attached to the scanner platform means, and applies torque to the scanner platform means. Also, a controller means is connected to the position sensor means and the actuator means in a feedback loop configuration, and is used to control the resonance of the scanner platform means.

DRAWINGS

These and other features, aspects, and advantages of the present disclosure will become better understood with regard to the following description, appended claims, and accompanying drawings where:

FIG. 1 shows an example of an unmanned aerial vehicle (UAV) that may be employed for the system, apparatus, and method for resonant scanners for 3D mapping, in accordance with at least one embodiment of the present disclosure.

FIG. 2 depicts a portion of the UAV shown in FIG. 1 that houses a resonant scanner for 3D mapping, in accordance with at least one embodiment of the present disclosure.

DESCRIPTION

Figure 3:
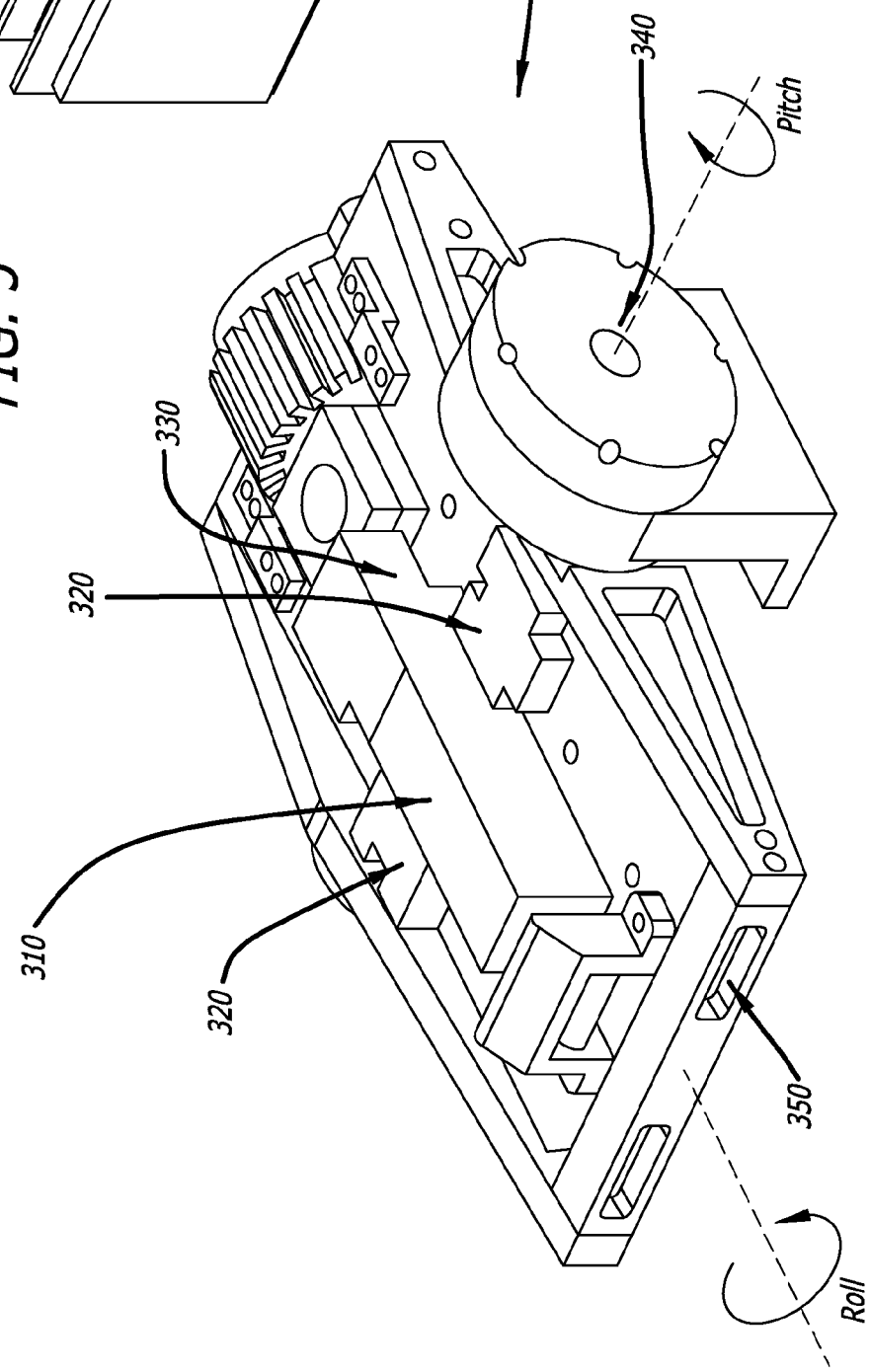
FIG. 3 illustrates a diagram of a resonant scanner for 3D mapping, in accordance with at least one embodiment of the present disclosure.

The methods and apparatus disclosed herein provide an operative system for resonant scanners for three-dimensional (3D) mapping. Specifically, this system relates to resonant scanners for mapping terrain in 3D space.

The disclosed system employs a small, lightweight articulating device that performs as a 3D Laser Detection and Ranging (LADAR) laser from a moving platform in a way that provides geolocation and takes advantage of mechanical resonance to amplify motion in the tilt axis. A LADAR is essentially a laser radar that determines the size and shape of an object by scanning it with a narrow pulsed laser beam and detecting the pulses that return. The difference in the return times of the return pulses indicate the relative shape of the object.

The disclosed device, which is a 3D LADAR scanner, has minimal interface requirements, and can be integrated into small-unmanned aerial vehicle (UAV) platforms, such as the Scaneagle and the Integrator. The smallest 3D LADAR scanner currently being manufactured is around an order of magnitude heavier than the disclosed resonant scanner. As such, the existing 3D LADAR scanners are considerably too large and too heavy to be housed in small UAV platforms. The size, weight, and power of the existing 3D LADAR scanners are all too excessive for the existing 3D LADAR scanners to be used for small UAV platforms as well as to be integrated into ground platforms as secondary payloads.

It should be noted that the existing 3D LADAR scanners employ bearings to allow for their rotation stages. The use of bearings limits the pointing performance of the existing 3D LADAR scanners to the stiction limits of the bearings. As such, the existing 3D LADAR scanner designs require additional system complexity to allow for an acceptable resolution when they are being used from airborne platforms. The resonant scanner of the present disclosure does not employ bearings for its rotation stages, but rather has a flexured rotational stage that allows for tailoring of the scanning axis resonance in order to take advantage of the resonant amplification. The ability to tailor the scanning axis resonance allows for a large reduction in the power requirements for the scanning axis.

The resonant scanner of the present disclosure has a number of additional advantageous features. One of these features is that the resonant scanner employs architecture that allows for a maximization of energy efficiency as well as for an acceptable vibration rejection. Another feature is that the resonant scanner has a low power/low observable sensor package that utilizes photon counting detector arrays. An additional advantageous feature of the resonant scanner is that the resonant scanner design is a flexured design with no stiction. Another advantageous feature is that the resonant scanner has a low onboard power draw.

Additionally, another advantageous feature of the disclosed resonant scanner is that the resonant scanner employs onboard gyros that allow for geolocation, inertial stabilization, and pointing with high accuracy. Another feature of the resonant scanner is that its design allows for high-resolution terrain mapping having a 10 square kilometer (Km) area coverage at 20 centimeters (cm)×20 cm×10 cm 3D resolution from an airborne platform flying at 25 Km per hour. An additional advantageous feature is that the scanning mechanism design of the resonant scanner allows for a reduction in the complexity of the cable routing from the LADAR sensor to the primary electronics and processor modules. Another advantageous feature is that the sensor packaging of the resonant scanner is much smaller and requires lower power than the sensor packaging of existing 3D LADAR scanners. The smaller sensor packaging and lower power requirement allow for a dramatic decrease in the overall system weight.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 shows an example of an unmanned aerial vehicle (UAV) 100 that may be employed for the system, apparatus, and method for resonant scanners for 3D mapping, in accordance with at least one embodiment of the present disclosure. In this figure, the UAV is shown to have a cutout 110 on one of its sides. A resonant scanner 120 is shown to be housed within the cutout 110 area of the UAV 100. Types of unmanned aerial vehicles (UAVs) that may be used to house the disclosed resonant scanner include, but are not limited to, the Scaneagle and the Integrator.

FIG. 2 depicts a portion 200 of the UAV shown in FIG. 1 that houses a resonant scanner for 3D mapping, in accordance with at least one embodiment of the present disclosure. This figure shows how the resonant scanner 120 along with a signal generator 130 fit within the portion 200 of the UAV in FIG. 1.

FIG. 3 illustrates a diagram of a resonant scanner 120 for 3D mapping, in accordance with at least one embodiment of the present disclosure. In this figure, the resonant scanner 120 is shown to include a laser 310, two gyros 320, a resonant scanner platform 330, an inductive coil 340 for an actuator, and a reflective telescope 350. The figure also shows a signal generator 130 that is used with the resonant scanner 120.

During operation of the resonant scanner 120, the laser 310 scans a narrow pulsed laser beam onto an object or terrain, and the reflective telescope 350 detects the pulses that return. The difference in the return times of the return pulses indicate the relative shape of the object or terrain.

Figure 4:
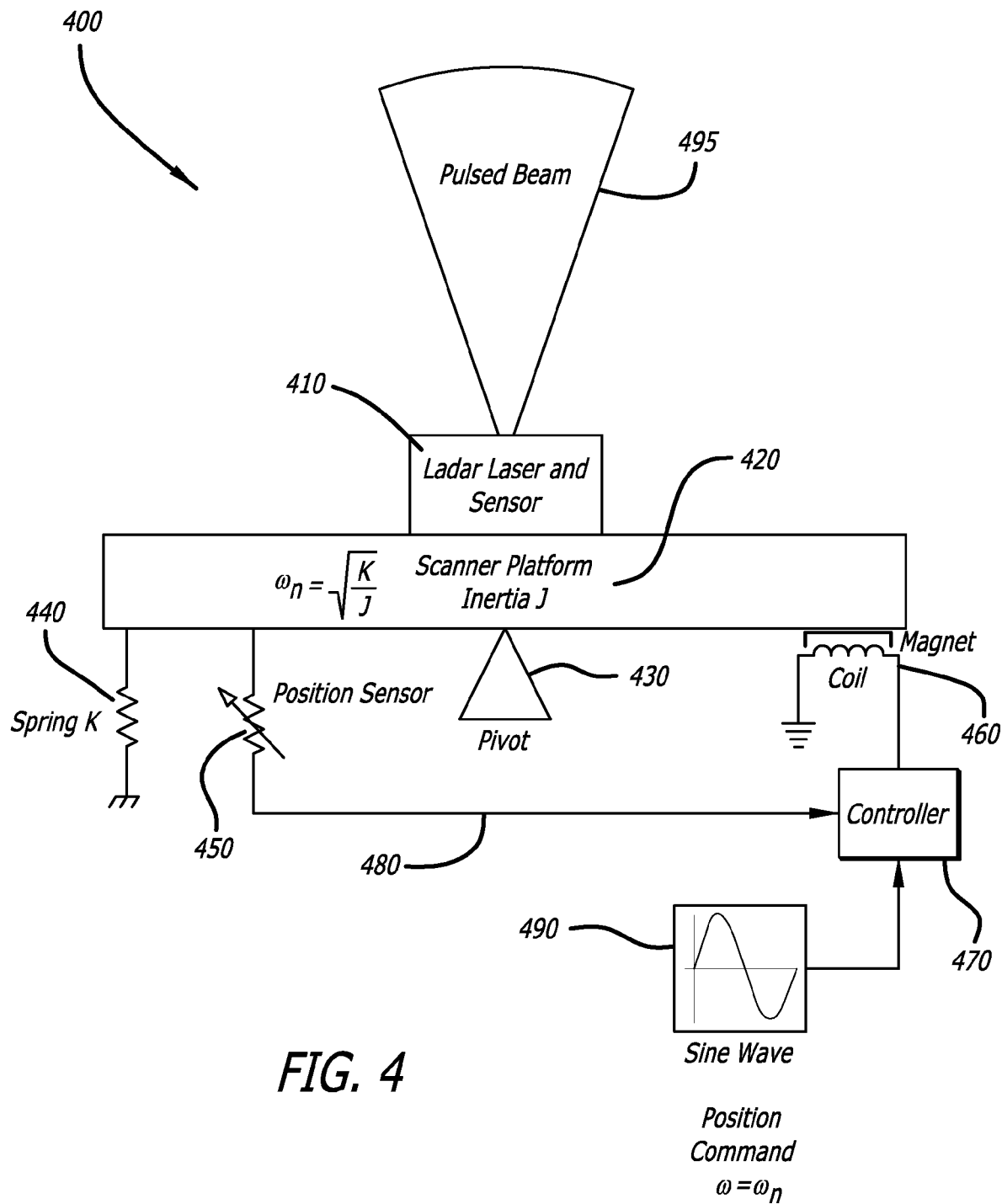
FIG. 4 shows a simplified block diagram for a resonant scanner for 3D mapping, in accordance with at least one embodiment of the present disclosure.

FIG. 4 shows a simplified block diagram 400 for a resonant scanner for 3D mapping, in accordance with at least one embodiment of the present disclosure. In this figure, a LADAR laser and sensor 410 are mounted on a top side of a scanner platform 420. Also shown in this figure, the scanner platform 420 is mounted on top of a pivot 430. The pivot 430 is located in the center of the bottom side of the scanner platform 420. In addition, one end of a spring 440 is connected to an end of the bottom-side scanner platform, and the opposite end of the spring 440 is attached to ground. The spring 440 causes the scanner platform to resonate about the pivot 430. In one or more embodiments, the scanner platform resonates in a roll direction and/or a pitch direction. (See FIG. 3 for direction orientations in relation to the scanner platform.) In some embodiments, the resonant scanner for 3D mapping includes more than one pivot 430.

Also in this figure, a variable position sensor 450 is attached to the scanner platform. The variable position sensor 450 is used to determine the tilt position and/or the resonance rate of the scanner platform. In addition, an actuator 460 is attached to the bottom side of the end of the scanner platform 420 that is opposite the end of the scanner platform 420 that has the spring 440 connected to it. The actuator 460 applies torque to the scanner platform 420 in order to increase the resonance of the scanner platform 420. In one or more embodiments, the actuator 460 comprises a magnet and an inductive coil. In alternative embodiments, the actuator 460 comprises a piezoelectric crystal (not shown in figure).

In addition, a controller 470 is connected to the variable position sensor 450 and the actuator 460 in a feedback loop configuration 480. The controller 470 is used to control the resonance of the scanner platform 420.

In one or more embodiments, the scanner platform 420 has an inertia J, and the spring 440 has a spring constant K. In at least one embodiment, the scanner platform 420 resonates at an angular frequency $$\omega_n = \sqrt{\frac{K}{J}}.$$

In some embodiments, a signal generator 490 is connected to the controller 470. The signal generator 490 provides a periodic signal at an angular frequency $\omega \approx \omega_n$. Types of periodic signals that the signal generator 490 may produce include, but are not limited to, a sine wave, a square wave, and a saw tooth wave.

During operation of the resonant scanner, the LADAR laser 410 radiates a pulsed laser beam 495. Also during operation, the spring 440 resonates the scanner platform 420 about the pivot 430. Additionally, the position sensor 450 determines the tilt position and/or resonance rate of the scanner platform 420. The tilt position and/or the resonance rate of the scanner platform 420 are inputted into the controller 470. In addition, the periodic signal generated by the signal generator 490, which has an angular frequency $\omega \approx \omega_n$, is inputted into the controller 470. Based on the inputs that the controller 470 receives, the controller 470 outputs a signal to the actuator 460 for the actuator 460 to apply torque to the scanner platform 420 in order for the scanner platform to resonate at an angular frequency $$\omega_n = \sqrt{\frac{K}{J}}.$$

As such, the system is driven with a periodic signal at a frequency $\omega \approx \omega_n$. This results in a system that uses very little electrical power to produce the required scanning motion.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A resonant scanner for three-dimensional (3D) mapping, the resonant scanner comprising:
   a laser detection and ranging (LADAR) laser and sensor;
   a scanner platform, wherein the LADAR laser and sensor are mounted on the scanner platform;
   a pivot, wherein the scanner platform is mounted on the pivot;
   a spring, wherein the spring is connected to the scanner platform and causes the scanner platform to resonate about the pivot;
   a position sensor, wherein the position sensor is attached to the scanner platform in order to determine the tilt position and resonance rate of the scanner platform;
   an actuator, wherein the actuator is attached to the scanner platform and applies torque to the scanner platform;
   a controller, wherein the controller is connected to the position sensor and the actuator in a feedback loop configuration and is used to control the resonance of the scanner platform,
   wherein the scanner platform has an inertia J, and the spring has a spring constant K, and
   wherein the scanner platform resonates at an angular frequency $$\omega_n = \sqrt{\frac{K}{J}};$$

and
   a signal generator, wherein the signal generator is connected to the controller,
   wherein the signal generator provides a periodic signal at an angular frequency $\omega \approx \omega_n$.

2. The resonant scanner for 3D mapping of claim 1, wherein the periodic signal is a sine wave.

3. The resonant scanner for 3D mapping of claim 1, wherein the periodic signal is a square wave.

4. The resonant scanner for 3D mapping of claim 1, wherein the periodic signal is a sawtooth wave.

5. The resonant scanner for 3D mapping of claim 1, wherein the actuator comprises a magnet and an inductive coil.

6. The resonant scanner for 3D mapping of claim 1, wherein the actuator comprises a piezoelectric crystal.

7. The resonant scanner for 3D mapping of claim 1, wherein the LADAR laser radiates a pulsed beam.

8. The resonant scanner for 3D mapping of claim 1, wherein the scanner platform resonates in a roll direction.

9. The resonant scanner for 3D mapping of claim 1, wherein the scanner platform resonates in a pitch direction.

10. The resonant scanner for 3D mapping of claim 1, wherein the scanner platform resonates in a roll direction and a pitch direction.

11. A method for three-dimensional (3D) mapping, the method comprising:
    providing a resonant scanner that comprises:
       a laser detection and ranging (LADAR) laser and sensor,
       a scanner platform, wherein the LADAR laser and sensor are mounted on the scanner platform,
       a pivot, wherein the scanner platform is mounted on the pivot,
       a spring, a position sensor, and an actuator,
       wherein the spring, the position sensor, and the actuator are each connected to the scanner platform,
       a controller, wherein the controller is connected to the position sensor and the actuator in a feedback loop configuration, and
       a signal generator, wherein the signal generator is connected to the controller;
    resonating with the spring the scanner platform about the pivot;
    determining with the position sensor the tilt position and resonance rate of the scanner platform;
    applying torque with the actuator to the scanner platform;
    controlling with the controller the resonance of the scanner platform,
    wherein the scanner platform has an inertia J, and the spring has a spring constant K, and
    wherein the scanner platform resonates at an angular frequency $$\omega_n = \sqrt{\frac{K}{J}};$$

and
    providing, by the signal generator, a periodic signal at an angular frequency $\omega \approx \omega_n$.

12. The method for 3D mapping of claim 11, wherein the periodic signal is a sine wave.

13. A resonant scanner for three-dimensional (3D) mapping, the resonant scanner comprising:
    a laser detection and ranging (LADAR) laser means and sensor means;
    a scanner platform means, wherein the LADAR laser means and sensor means are mounted on the scanner platform means;
    a pivot means, wherein the scanner platform means is mounted on the pivot means;
    a spring means, wherein the spring means is connected to the scanner platform means and causes the scanner platform means to resonate about the pivot means;
    a position sensor means, wherein the position sensor means is attached to the scanner platform means in order to determine the tilt position and resonance rate of the scanner platform means;
    an actuator means, wherein the actuator means is attached to the scanner platform means and applies torque to the scanner platform means;
    a controller means, wherein the controller means is connected to the position sensor means and the actuator means in a feedback loop configuration and is used to control the resonance of the scanner platform means, wherein the scanner platform means has an inertia J, and the spring means has a spring constant K, and wherein the scanner platform means resonates at an angular frequency $$\omega_n = \sqrt{\frac{K}{J}};$$

and a signal generator means, wherein the signal generator means is connected to the controller means, and the signal generator means provides a periodic signal at an angular frequency $\omega \approx \omega_n$.

14. The method for 3D mapping of claim 11, wherein the periodic signal is a square wave.

15. The method for 3D mapping of claim 11, wherein the periodic signal is a sawtooth wave.

16. The method for 3D mapping of claim 11, wherein the actuator comprises a magnet and an inductive coil.

17. The method for 3D mapping of claim 11, wherein the actuator comprises a piezoelectric crystal.

18. The method for 3D mapping of claim 11, wherein the method further comprises radiating, by the LADAR laser, a pulsed beam.

19. The method for 3D mapping of claim 11, wherein the scanner platform resonates in at least one of a roll direction and a pitch direction.

* * * * *